United States Patent [19]

Daech et al.

[11] Patent Number: 6,069,197
[45] Date of Patent: May 30, 2000

[54] ADHESIVE FOR ALUMINUM USING ALUMINUM-LITHIUM CORROSION INHIBITORS

[75] Inventors: Alfred F. Daech, Gretna; Nikhil K. Sarkar, New Orleans, both of La.

[73] Assignees: University of New Orleans Foundation, New Orleans; The Board of Supervisors of Louisiana State University and Agricultural and Mechanical College, Baton Rouge, both of La.

[21] Appl. No.: 09/236,482

[22] Filed: Jan. 25, 1999

Related U.S. Application Data

[60] Provisional application No. 60/074,900, Feb. 17, 1998.
[51] Int. Cl.⁷ .................................................. C08K 3/00
[52] U.S. Cl. ........................ 524/439; 524/441; 156/327; 156/330; 156/331.7; 156/331.8
[58] Field of Search .................................. 156/327, 330, 156/331.7, 331.8; 524/438, 441

[56] References Cited

U.S. PATENT DOCUMENTS

| | | |
|---|---|---|
| Re. 35,576 | 7/1997 | Buchheit, Jr. et al. . |
| 3,180,746 | 4/1965 | Patton et al. . |
| 3,180,747 | 4/1965 | Patton et al. . |
| 3,248,250 | 4/1966 | Collins, Jr. . |
| 3,356,515 | 12/1967 | McGlothlin . |
| 3,490,926 | 1/1970 | Lee et al. . |
| 4,015,040 | 3/1977 | Yoshida et al. . |
| 4,063,969 | 12/1977 | Howell, Jr. . |
| 4,341,878 | 7/1982 | Marcantonio et al. . |
| 4,351,883 | 9/1982 | Marcantonio et al. . |
| 4,435,215 | 3/1984 | Yoshino et al. . |
| 4,479,824 | 10/1984 | Schutt . |
| 4,812,245 | 3/1989 | Burba, III et al. . |
| 5,266,356 | 11/1993 | Buchheit, Jr. et al. . |
| 5,322,713 | 6/1994 | van Ooij et al. . |
| 5,336,303 | 8/1994 | Cocks . |
| 5,466,280 | 11/1995 | Lee et al. . |

OTHER PUBLICATIONS

Daech et al., Appendix B—Inexpensive Non–Toxic Pigment Substitute for Chromium in Primer for Aluminum Substrate, 1995.

A F Daech "Environmentally Acceptable Corrosion Resistant Coating for Aluminum Alloys", 1997.

Daech et al., "Appendix B—Inexpensive Non–Toxic Pigment Substitute for Chromium in Primer for Aluminum Substrate, GCRMTC Project No. AMTC95–001C," Gulf Coast Region Maritime Technology Center, Quarterly Report, 95—GCRMTC—QR03, B1–B7, Jul. 1, 1995–Sep. 30, 1995.

Drewien et al., "Lithium–Aluminum–Carbonate–Hydroxide Hydrate Coatings on Aluminum Alloys: Composition, Structure, and Processing Bath Chemistry," J. Mater. Res., 11(6):1507–1513 (1996).

Buchheit et al., "Non–Chromate Talc Conversion Coatings for Aluminum," Paper No. 542, NACE Corrosion 94, pp. 1–13.

A.F. Daech, "Environmentally Acceptable Corrosion Resistant Coating for Aluminum Alloys," 1997 Ship Production Symposion, pp. 1–7.

*Primary Examiner*—Edward J. Cain
*Attorney, Agent, or Firm*—Garvey, Smith, Nehrbass & Doody, L.L.C.

[57] ABSTRACT

An adhesive composition comprising aluminum lithium alloy particles and a multi functional polymer resin is disclosed. Methods for preventing corrosion, for bonding two substrates comprising aluminum together, and for heat-free welding two substrates preferably comprising aluminum or aluminum alloy using the adhesive compositions of the invention are also disclosed.

25 Claims, 7 Drawing Sheets

ADHESIVE FOR ALUMINUM USING ALUMINUM-LITHIUM CORROSION INHIBITORS

Priority of U.S. Provisional Patent Application Ser. No. 60/074,900, filed Feb. 17, 1998, incorporated herein by reference, is hereby claimed.

The subject matter of this application was made with the support of the U.S. government, under Cooperative Agreement No. N00014-94-2-0011, awarded by the Office of Naval Research. The U.S. government has certain rights in the invention. The technical report detailing the subject matter of this application, entitled "Inexpensive Non-Toxic Pigment Substitute For Chromium In Primer For Aluminum Substrate—Final Report," submitted to the Gulf Cost Region Maritime Technology Center, University of New Orleans, is hereby incorporated by reference into this application.

The present invention relates to anti-corrosive adhesive compositions. More particularly, the present invention relates to adhesive compositions containing aluminum-lithium alloy particles in a multi functional polymer carrier. The disclosed compositions are capable of preventing corrosion of substrates, preferably comprised of aluminum or aluminum alloy, to which they are applied. The present invention further relates to methods of preventing corrosion of substrates using the adhesive compositions of the invention.

In the maritime and airplane manufacturing industries, in particular, a corrosion resistant composition, such as a paint, primer or coating, for aluminum based ships and airplanes that can protect the ships and airplanes from all sorts of corrosion, for example, when exposed to salt water, humidity, and other corrosive environments, has been desired for years. Since chromium compounds provide outstanding corrosion protection of certain metals, in particular aluminum, chromates have prevalently been used in the chemical conversion coating, i.e., corrosion resistance coating, of aluminum. However, chromates are carcinogenic and, therefore, a replacement for them was sought that was non-carcinogenic. Environmental agencies furthermore limit the amount of chromium ion tolerated in waste water to less than one part per million. An environmentally benign substitute was thus also desired. Since most available aluminum corrosion inhibitors are based on heavy metals, such as lead, zinc, and chromium, or on reactive amides, the available logical alternates were evaluated and discovered to fall short of the desired performance in corrosion inhibition and providing environmental suitability. Surprisingly, since lithium is not considered a heavy metal or a reactive amide, various lithium-based compounds appear to offer a viable alternative to chromium using a new concept of corrosion inhibition.

Lithium carbonate in solution, for example, has been shown to protect certain metals, particularly aluminum, from corrosion by reacting at the surface. See, e.g., R.G. Buckheit, "Non-Chromate Talc Conversion Coatings for Aluminum," Paper No. 542 NACE Corrosion 94; C. A. Drewien, J. L. Finch; Sandia. Analysis by a secondary ion mass spectrometer (SIMS) has confirmed this phenomenon. Sodium carbonate and potassium carbonate reactions, however, produced an undesirable soluble product and no alkali was detected on the surface by SIMS after a water rinse, indicating that only lithium deposits a water insoluble deposit on the aluminum. Because of their solubility and reactivity, alkaline metal compounds other than lithium are not suitable for corrosion protection.

It has also been observed that, under certain conditions, certain aluminum-lithium alloys have demonstrated some diffusion of lithium to the surface of the alloy so that it can protect the underlying metal and/or alloy. The lithium ion is so small that it penetrates the large interstitial spaces of the aluminum oxide layer. The aluminum-lithium alloys are stable in chemical compositions at ordinary temperatures, but a lithium-rich surface can be easily produced from the alloy by briefly heating under an atmosphere of inert non-oxidizing gas, e.g., nitrogen, to facilitate the migration of the lithium and prevent oxidation. It has also been observed that certain lithium alloys or compounds can be incorporated into a paint vehicle or otherwise deposited on the surface of aluminum and aluminum alloys to provide corrosion protection to the underlying substrate when exposed to salt water, humidity, and other corrosive environments. In addition, metallic aluminum and aluminum alloys normally provide their own corrosion protection due to their tendency to form an aluminum oxide insulator on the surface, but a matrix of hydrated aluminum oxide can be penetrated by chemicals such as sodium chloride, acids, and bases.

Electrochemical techniques of corrosion testing, which can measure the corrosion propensity of various alloys of aluminum, as well as of aluminum, have continued to be used to identify components and/or systems capable of corrosion prevention. All corrosion, because it involves oxidation and reduction, can be measured by observing the flow of electrons in a system using a potentiostat. Electrical currents are simple to measure and can be directly related to electrochemical reaction rates through Faraday's Law. Alternating current techniques can also determine film resistivity and thickness values. A variety of electrochemical tests have been proposed and developed allowing various corrosion characteristics to be evaluated. SEM and simple magnification of target metals have effectively illustrated the surface modification caused by various lithium salts on laboratory specimens.

A known concept that has exhibited promise for preventing corrosion of aluminum and aluminum alloys, and shows promise as well for steel, are "nanostructural inhibitors." See, A. Daech, "Environmentally Acceptable Corrosion Resistant Coating for Aluminum Alloys," scheduled for publication in 1998, Ship Production Symposium, SNAME (Society of Naval Architects and Marine Engineers), the disclosure of which is specifically incorporated by reference herein. This concept involves a coating system that is based on passivation of aluminum and aluminum alloys by the application of lithium salts as paint pigments or additives. Using this concept, the aluminum lithium alloy particles are heated in an argon gas atmosphere which results in the relocation of the lithium contained in the particles onto the surface of the particles. The lithium, which is the passivating agent, is resultantly concentrated on or near the surface of the particles. In many instances, the pigment surface, i.e., the lithium at the surface, produces passivating influences on the substrate. Resultantly, the surface becomes highly electronegative and provides galvanic protection to the underlying substrate.

Since the number of molecules on the surface of the aluminum-lithium particles is usually a very small percentage, on the order of one atom to five thousand interior atoms, the amount of passivating chemical component, i.e., lithium, can be much more than the total percentage in the solid particle would indicate. Two phenomena occur upon heating of the particles. First, the lithium relocates to a location near the surface and provides galvanic protection to the underlying substrate due to the electronegativity. Second, the lithium on the surface is very reactive and can be a source for passivating any salts of lithium that have formed and that may react with air, moisture and other ingredients of the coating solution, as well as the aluminum/alloy substrate. The heated surface of the aluminum/alloy particles can contain up to 99% lithium. For each surface atom, there are approximately five thousand atoms inside the aluminum based lithium pigment particle. This concept has been preliminarily applied by the inventors towards inhibiting corrosion of aluminum and aluminum alloy substrates. The lithium furthermore is concentrated in the layers near the surface but protected by the aluminum in the alloy.

When corrosion inhibitors are used as solid particles, it is usually the surface which provides the protection to the underlying substrate. Unless the particles are consumed by corrosives, the balance of the pigment is of no consequence. Thus, very old iron coated with red lead-containing paint, for example, if cut with a knife, will still be bright orange after years of exposure to the environment due to the presence of excess corrosion inhibitors.

From the above, it is seen that there is an existing need for improved corrosion resistant coatings for aluminum, aluminum alloys, steel, and any other substrate exposed to environmental conditions capable of promoting corrosion, and that the surface of an inhibiting pigment, e.g., an aluminum-lithium based pigment, is more significant in preventing corrosion than the size or mass of the inhibitor, provided that the inhibiting pigment is not consumed in the inhibition process.

It is therefore an object of the present invention to provide a composition that affords improved anti-corrosive capability.

It is further an object of the invention to provide a composition that provides improved anti-corrosive capabilities to known primers, paints, or other compositions in which it can be contained and applied to an aluminum, aluminum alloy, steel or other substrates needing protection from corrosion.

It is another object of the present invention to provide a composition capable of achieving a chemical bond at the interface of the substrate to which it is applied and the coating composition containing a corrosion prevention element, such as an aluminum-lithuim alloy particle, that prevents the formation of air or moisture "bubbles," which promote corrosion, thereby providing improved corrosion protection and adhesion to the underlying substrate.

It is yet another object of the present invention to provide a coating or an adhesive which is light weight due to the nature of the pigment.

It is still another object of the present invention to impart anti-corrosive characteristics with a pigment that is both effective and environmental friendly.

Additional features and advantages of the present invention will be set forth in part in the description that follows, and in part will be apparent from the description, or may be learned by practice of the invention. The objectives and other advantages of the present invention will be realized and attained by means of the elements and combinations particularly pointed out in the written description and appended claims.

SUMMARY OF THE INVENTION

The foregoing objects have been accomplished in accordance with this invention by providing a composition comprising aluminum lithium alloy particles and a multi functional polymer carrier.

The present invention also includes a method for preventing corrosion of a substrate, preferably a steel substrate, and more preferably an aluminum or aluminum alloy substrate. By applying the composition of the invention to a steel or an aluminum or aluminum alloy substrate, a bond occurs between the composition and the substrate that effectively prevents corrosion of the substrate when exposed to salt water, humidity, and other corrosive environments.

The present invention further includes a method for bonding two substrates together, preferably two aluminum and/or aluminum alloy substrates, by applying an effective amount of the composition of the present invention to each of the substrates and then placing the substrates in contact with each other. Preferably, one of the substrates is a thermal insulator, which may be in the form of a composition, or a protective coating. By applying the composition of the invention to two substrates and contacting one substrate with the other, the two substrates are effectively adhered to each other.

The present invention additionally contemplates a method for heat-free welding two substrates together, preferably two aluminum and/or aluminum alloy substrates, by applying an effective amount of the composition of the present invention to each of the substrates and then placing the substrates in contact with each other. Preferably, one of the substrates is a thermal insulator, which may be in the form of a composition, or a protective coating. By applying the composition of the invention to two substrates, the two substrates are effectively adhered to each other, and the bond line between the adhesive and the substrate virtually disappears.

When used as an adhesive between two substrates, which preferably comprise aluminum or an aluminum alloy, a bond is created similar to that created by heat welding, without the application of heat or the evolution of fumes. The resultant bond or welding and the substrate underlying the resultant bond layer are intrinsically corrosion resistant by virtue of the chemical reaction occurring at the interface of the substrate and the composition of the invention and, unlike conventional adhesives, the bond line between the adhesive and the substrate is not obvious.

By using the adhesive compositions discussed herein, it is possible to achieve improved anti-corrosive capabilities, whether the disclosed compositions are used on their own or within various paints, primers or other contemplated compositions for coating various substrates.

It is to be understood that both the foregoing general description and the following detailed description are exemplary and explanatory only and are intended to provide further explanation of the present invention, as claimed.

DETAILED DESCRIPTION OF THE INVENTION

The present invention provides a composition comprising aluminum lithium alloy particles and a multi functional polymer carrier that, when applied, in particular, to an aluminum or an aluminum alloy, or even steel, substrate, is capable of functioning as an adhesive that achieves a bond at the interface of the composition and the substrate that essentially eliminates the bond line at this interface. A "weld-like" bond between the composition and the substrate is created. The chemical bond resultantly formed at the interface exhibits essentially no bond line, indicating that the alloy in the composition has essentially become part of the underlying substrate. This occurrence renders the alloy particles resistant to mechanical removal from the surface of the substrate. Accordingly, an adhesive quality is observed and the adhesive composition itself is resistant to mechanical removal from the underlying substrate.

The benefits of a "weld-like" bond at the interface of the composition and the substrate are numerous. In particular, the interface bond prevents the formation of air or moisture "bubbles" that ultimately allow corrosion to occur at the interface. In addition, if the composition of the invention is applied between two substrates, e.g., two aluminum or aluminum alloy substrates, the interface bond occurs and effectively adheres the two substrates to each other, essentially removing the interface between the two substrates. Advantageously, the compositions in accordance with the present invention bond, or weld, two substrates together without applying heat or producing fumes. The advantages mentioned above can be accomplished by heating, as in welding, but welding is not always desirable or, in the case of use of aluminum-lithium, is prohibited because of the volatility of lithium metals and other changes due to heat.

Upon application of the compositions of the invention to a substrate, the methods of the present invention generally involve the initial formation of crystals, e.g., lithium aluminates. When the inventive compositions are applied to aluminum or aluminum alloy substrates, followed by chemical bonding of the crystals formed with the attendant multi functional polymers, there results an anchoring in situ of the crystals to the underlying substrate layer. The anchoring of the components of the compositions of the invention to the underlying substrate produces a bonded layer on the substrate. The bonded layer, because of its multi functional nature, e.g., possessing multiple reaction sites such as the carboxylic groups, is receptive to organic paints, decals, and adhesives.

The aluminum lithium alloy particles useful in accordance with the present invention can be of any aluminum-lithium alloy. The alloy particles are preferably used in accordance with the invention in the form of a powder. The powder particles can be of approximately 80 to 400 mesh size, and preferably are about 200 mesh. Several powders useful in accordance with the present invention are commercially available from various sources, including, but not limited to, Homogenous Metals Corporation, Comalco, Reynolds Weldalite®, etc., or the alloy particles can be prepared according to known methods. In particular, Alcoa 2090 or Alcoa 8090, both available from Homogenous Metals Corporation, are advantageously used in accordance with the present invention.

Preferably, the alloy particles comprise an aluminum-lithium powder that has been surface enriched with lithium by heating under an argon gas atmosphere and subsequently treated with selected anions which are environmentally acceptable. The treatment with argon is preferably conducted by heating at approximately 350° C. for a time period up to about one hour. Particle sizes larger than those desired can be filtered out. More preferably, the alloy particles are known inhibitors, such as those mentioned above.

The aluminum lithium alloy particles preferably used in accordance with the present invention comprise approximately 3% lithium. The remaining 97% of the particles is comprised of mostly aluminum. However, the alloy particles useful in accordance with the present invention can comprise from 0.1% to 6.0% lithium.

Also contemplated are aluminum alloy particles containing various additives, including, for example, silicon, iron, copper, manganese, magnesium, chromium, nickel, zinc, titanium, scandium, and the like. Advantageously, a small amount of zinc powder can be added to the aluminum lithium powder to improve adhesion between the composition and the substrate.

In accordance with the invention, the aluminum lithium alloy particles are contained in and/or combined with a multi functional polymer resin carrier. By multi functional polymer, it is meant any water soluble polymer containing carboxylic and/or phosphino-carboxylic acid functional groups. Preferred multi functional polymer resins include epoxy, vinyl, urethane, acrylic and latex vehicles. The adhesive formed by the polyfunctional carboxylic acid ideally will be converted in the preparation process from water soluble to water insoluble. Lithium silicate and most latexes are also water soluble, or water reducible when applied, and after drying also become water resistant.

The multi functional polymers that can be used in accordance with the present invention are generally water soluble until reacted with the aluminum based substrate and the aluminum/lithium particles. All particles and multi functional polymer resins should easily mix. Only small amounts of water are needed to spread the composition to the desired thickness, and the amount of water is advantageously minimized so that residual water is minimized and not trapped anywhere near the interface at which corrosion protection is desired.

Contemplated polymers that may be used in accordance with the invention include, but are not limited to polyacids, phosphonate resins, and silicates, such as lithium silicate. For example, polyacrylic acid, having a molecular weight of approximately 30,000, such as E-7, available from the company Allied Colloids, and alkalinated, preferably with ionized lithium hydroxide (LiOH), phosphino-carboxylic acid, such as Belcor 575, available from the company FMC Corporation of North Carolina, are useful in accordance with the invention. Polymaleic acid polymers or copolymers of polyacrylic and polymaleic acid are also considered to be within the scope of the present invention. These are also water reducible and become insoluble upon drying.

The compositions of the invention can be applied to various substrates and achieve the disclosed anti-corrosive results. In this manner, the substrates that can be used in accordance with the present invention include substrates comprised of aluminum, aluminum alloys, and steel. Steel substrates are included within the scope of the present invention, are capable of achieving the disclosed bond when a composition in accordance with the invention is applied thereto, and are provided galvanic protection by the aluminum lithium.

The compositions of the invention can be applied to the contemplated substrates directly, or can be contained in any compatible known organic paint or primer, such as vinyls, epoxies, polyesters, alkyls, latexes, urethanes, and silicates. Preferably, when the compositions of the invention are contained in a known paint or primer, commercially available or not, they are present in an amount preferably not exceeding 50 weight percent of the paint or primer, and more preferably, not exceeding 10 weight percent.

The aluminum lithium pigment particles contained in the multifunctional polymer carriers in accordance with the present invention are advantageously incorporated into paint or primer vehicles for application to the substrates to be protected. The vehicles that can be used in accordance with the present invention include latexes, epoxies, solvent bases and inorganic vehicles. Inorganic vehicles are preferred because they are available in water based form and become water insoluble and provide good adhesion to metal after curing and drying. Particularly advantageous inorganic vehicles include inorganic lithium silicate, for example, Lithsil-6 manufactured by FMC Corporation, partially hydrolyzed ethyl silicate, and sodium silicates. The lithium silicate is preferred since it provides additional lithium and minimizes noncontributory ingredients such as sodium.

The present invention will further be clarified and illustrated by the following examples, which are intended to be purely exemplary of the invention.

EXAMPLES

The following examples were performed and the results evaluated by a scanning electron microscope (SEM), which facilitated inspection of the treated metal panels for the quality of the passivating film coating. The microscope was also used to inspect bond lines and surface morphology. Photographic slides showing the results of the following examples were obtained using the scanning electron microscope by examining the sides of cuts made perpendicular to the panels being evaluated. Magnifications ranged from 200 to 2000 times and are shown in each of FIGS. 2–25.

The substrates used in the following examples were metal panels ordered from the Q-Panel Company of Cleveland, Ohio. "Buttons", i.e., small coin-like samples from Metal Samples Co., Inc. of Munford, Alabama, of the various aluminum alloys certified as Al 1100, Al 2090, Al 2219, Al 5005, Al 5052, Al 5456, Al 7075, and Al 6061 were also tested for passivity. All the buttons tested were passivated by the lithium to some degree. Aluminum panel (Al 6061 T6) was selected as the alloy for general testing since it is commonly used in bridges and bulkheads and large quantities were readily available. Following evaluation of the button samples, test panels were shipped to an independent testing laboratory for substantiating the results on a larger scale.

Three types of aluminum alloy Q-panels and one type of steel panel were obtained and evaluated in the following corrosion tests. The tested panels were Al 5052, Al 3003, and cold rolled steel panels. Seven groups of samples, respectively A–F, were tested to evaluate different pigment compositions and various reactions or treating conditions. Lithsil-6 by FMC Corporation was used as the main multi functional polymer vehicle for the Alcoa 2090 aluminum lithium pigment composition.

The other additives in the pigment compositions evaluated include mica, lithium molybdate, sodium borate, and zinc powder. The treated panels were sent to the independent testing laboratory, KTA Tater, for evaluation in accordance with the ASTM B117 salt spray evaluation, for 168 hours. After 168 hours of salt fog exposure, the panels were evaluated, and the results observed are shown in Table 1. The treatment performed on each panel is described below following Table 1.

Corrosion Testing

The ability of the compositions of the present invention to prevent corrosion was evaluated as follows:

Example 1

The sample panels identified above were coated with variations of the compositions generally discussed above.

One coat of the respective treatment composition was applied on each panel. The panels were air dried for seven days at room temperature and were then completely immersed in a 5% NaCl solution having a temperature of 60° C. The coated sample panels were allowed to remain in the NaCl solution for 40 hours. After 40 hours, the panels were removed and the coating was evaluated to see if any corrosion had occurred to the underlying substrate (panel). The results are shown in Table 1. In each case, the substrate underlying the coatings was unaffected by the NaCl solution.

Example 2

The sample panels identified above were coated, as detailed in Example 1, and were evaluated in a commercial lab, KTA Tater, salt cabinet for 168 hours per ASTM-B 117 salt spray protocol. Following 168 hours in the salt cabinet being exposed to salt fog, the substrate (panel) beneath each of the coatings exhibited no corrosion, thus corrosion protection was confirmed. The results are shown in Table 1. All panels received one coat of primer, as in Example 1. Two panels were given a single epoxypolyamide topcoat, as indicated in Table 1.

The sample panels were also evaluated for face rust in accordance with ASTM D-610, for blistering in accordance with ASTM D-714, and for undercutting in accordance with ASTM D-1654. Face rust results range from a rating of 10, corresponding to no rust, to a rating of 0, corresponding to 50% or more rust (see Table 1). ASTM D 610 is "The Standard Method of Evaluating Degree of Rusting on Painted Steel Surfaces." ASTM D-714 is "The Standard Method of Evaluation Degree of Blistering of Paints." ASTM D 1654 is "The Standard Evaluation of Painted or Coated Specimens Subjected to Corrosive Environments."

Preparation of Coating Compositions:

The general procedure used for producing the various coatings containing the compositions of the invention for evaluation was as follows.

The abraded and cleaned metallic panels were immersed in lithium or non-lithuim lithium-containing solutions, as indicated in Table 1. Following exposure of the panels for the indicated time periods, the panels were removed from the respective solutions, rinsed thoroughly with distilled water, and air dried. The specific details for the various coating composition preparations are shown in Table 2 (below).

The scanning electron microscope was used to characterize the surface nature of the treated panels. Typical micrographs illustrating the representative surface morphology of various panels are shown in FIGS. 2–18. Magnification was as indicated on the individual photographs. See, FIGS. 2–25.

TABLE I

Summary of Al—Li Pigment Variation of Treatment

| GROUP | SET | PANEL ID | VARIATION OF TREATMENT | FACE RUST ASTM D-610 | BLISTERS ASTM D-714 | SCRIBE UNDER-CUTTING ASTM D-1654 | DISCUSSION & CONCLUSION |
|---|---|---|---|---|---|---|---|
| A | 1 | AD/13 | Formula of pigment: | 9 | None | None | Aluminum 6061 was the |
|   |   | AD/14 | Al—Li powder (350 C., 15 min) = 57.5 | 8 | None | None | best alloy compared to |
|   |   | AD/15 | MICA = 7.5 | 9 | None | None | others to pass the test; |
|   | 2 | A5/26 | Lithsil-6 = 100 | 9 | None | None | steel was the least |
|   |   | A5/27 | Li2MoO4 = 0.5 | 9 | None | None | protected. |
|   |   | A5/28 | Na2B4O710H2O = 0.4 (of total wt) | 7 | None | None | Note: In the panel ID |
|   | 3 | A3/3 | Drying condition: 70 C., 5 hrs. | 7 | None | None | column of this table, "A" |
|   |   | A3/7 |  | 3–4 | None | None | represents the |
|   |   | A3/2 |  | 9 | None | None | aluminum and "S" |
|   | 4 | S1 |  | 0 (red rust) | None | Heavy | represents steel |
|   |   | S2 |  | 2–3 (red rust) | None | Slight |  |
|   |   | S3 |  | 0 (red rust) | None | Moderate |  |
|   |   | S4 |  | 2–3 (red rust) | None | Slight |  |
| B | 5 | A6/17 | Formula of pigment: | 9 | None | None | There was no significant |
|   |   | A6/19 | Al—Li powder (350 C., 15 min) = 57.5 | 8 | None | None | difference between air |
|   |   | A6/21 | MICA = 7.5 | 7 | None | None | dry and heat dry. |
|   |   |   | Lithsil-6 = 100 |   |   |   |   |
|   |   |   | Li2MoO4 = 0.5 |   |   |   |   |
|   |   |   | Na2B4O710H2O = 0.4 (of total wt) |   |   |   |   |
|   |   |   | Drying condition: 180 C., 0.5 hrs. |   |   |   |   |
|   | 6 | A6/11 | Formula of pigment: | 9 | None | None |   |
|   |   | A6/3 | Al—Li powder (350 C., 15 min) — 57.5 | 10 | None | None |   |
|   |   | A6/4 | MICA = 7.5 | 9 | None | None |   |
|   |   |   | Lithsil-6 = 100 |   |   |   |   |
|   |   |   | Li2MoO4 = 0.5 |   |   |   |   |
|   |   |   | Na2B4O710H2O = 0.4 (of total wt) |   |   |   |   |
|   |   |   | Drying condition: room 20 C. |   |   |   |   |
|   | SET 1 | A6/13 | Formula of pigment: |   |   |   |   |
|   |   | A6/14 | Al—Li powder (350 C., 15 min) = 57.5 | 9 | None | None |   |
|   |   | A6/15 | MICA = 7.5 | 8 | None | None |   |
|   |   |   | Lithsil-6 = 100 | 9 | None | None |   |
|   |   |   | Li2MoO4 = 0.5 |   |   |   |   |
|   |   |   | Na2B4O710H2O = 0.4 (of total wt) |   |   |   |   |
|   |   |   | Drying condition: 70 C., 5 hrs. |   |   |   |   |
| C | 7 | A6/24 | Formula of pigment: | 6 | None | None | Heated power was |
|   |   | A6/25 | Al—Li powder (not heated) = 57.5 | 8 | None | None | better. 15 minutes |
|   |   | A6/26 | MICA = 7.5 | 6 | None | None | heating time was |
|   |   |   | Lithsil-6 = 100 |   |   |   | enough |

TABLE I-continued

Summary of Al—Li Pigment Variation of Treatment

| GROUP | SET | PANEL ID | VARIATION OF TREATMENT | FACE RUST ASTM D-610 | BLISTERS ASTM D-714 | SCRIBE UNDER- CUTTING ASTM D-1654 | DISCUSSION & CONCLUSION |
|---|---|---|---|---|---|---|---|
| | | | Li2MoO4 = 0.5<br>Na2B4O710H2O = 0.4 (of total wt)<br>Drying condition: 70 C., 0.5 hrs. | | | | |
| | 6 | A6/33<br>A6/34<br>A6/35 | Formula of pigment:<br>Al—Li powder (350 C., 0.5 hr.) — 57.5<br>MICA = 7.5<br>Lithsil-6 = 100<br>Li2MoO4 = 0.5<br>Na2B4O710H2O = 0.4 (of total wt)<br>Drying condition: room 20 C. | 9<br>9<br>9 | None<br>None<br>None | None<br>None<br>None | |
| | 1 | A6/13<br>A6/14<br>A6/15 | Formula of pigment:<br>Al—Li powder (350 C., 15 min) = 57.5<br>MICA = 7.5<br>Lithsil-6 = 100<br>Li2MoO4 = 0.5<br>Na2B4O710H2O = 0.4 (of total wt)<br>Drying condition: 70 C., 5 hrs. | 9<br>8<br>9 | None<br>None<br>None | None<br>None<br>None | |
| D | 9 | A6/30<br>A6/31<br>A6/32 | Formula of pigment:<br>Al—Li powder (350 C., 15 min) = 57.5<br>MICA = 7.5<br>Lithsil-6 = 100<br>Li2MoO4 = 0.5<br>Na2B4O710H2O = 0.4 (of total wt)<br>Drying condition: 70 C., 0.5 hrs. | 8<br>8<br>7 | None<br>None<br>None | None<br>None<br>None | Li2MoO4 gave the better protection against pitting corrosion. |
| | 1 | A6/13<br>A6/14<br>A6/15 | Formula of pigment:<br>Al—Li powder (350 C., 15 min) — 57.5<br>MICA = 7.5<br>Lithsil-6 = 100<br>Li2MoO4 = 0.5<br>Na2B4O710H2O = 0.4 (of total wt)<br>Drying condition: room 70 C., 5 hrs. | 9<br>8<br>9 | None<br>None<br>None | None<br>None<br>None | |
| E | 10<br>1 | A6/20<br>A6/22 | Surface pre-treatment:<br>15% HNO3, 5 sec.<br>Formula of pigment:<br>Al—Li powder (350 C., 15 min) = 57.5<br>MICA = 7.5<br>Lithsil-6 = 100<br>Li2MoO4 = 0.5<br>Na2B4O710H2O = 0.4 (of total wt)<br>Drying condition: 70 C., 5 hrs. | 8<br>4 | None<br>None | None<br>None | Acid pre-treatment of the panels did not reduce corrosion |
| | 1 | A6/13<br>A6/14<br>A6/15 | Formula of pigment:<br>Al—Li powder (350 C., 15 min) = 57.5<br>MICA = 7.5<br>Lithsil-6 = 100<br>Li2MoO4 = 0.5<br>Na2B4O710H2O = 0.4 (of total wt)<br>Drying condition: 70 C., 0.5 hrs. | 9<br>8<br>9 | None<br>None<br>None | None<br>None<br>None | |
| F | 11 | A6/27<br>A6/28<br>A6/29 | Formula of pigment:<br>Al—Li powder (350 C., 15 min) — 57.5<br>MICA = 7.5<br>Lithsil-6 = 100<br>Li2MoO4 = 0.5<br>Na2B4O710H2O = 0<br>Drying condition: room 70 C., 5 hr. | 8<br>8<br>7 | None<br>None<br>None | None<br>None<br>None | Curing agent was good for pigment curing. A borate powder enhanced corrosion protection. |
| | 1 | A6/13<br>A6/14<br>A6/15 | Formula of pigment:<br>Al—Li powder (350 C., 15 min) — 57.5<br>MICA = 14<br>Lithsil-6 = 100<br>Li2MoO4 = 0.5<br>Na2B4O710H2O = 0<br>Drying condition: 70 C., 5 hrs. | 9<br>8<br>9 | None<br>None<br>None | None<br>None<br>None | |
| OTHERS | All panels Aluminum alloy 5052 | 18 | Formula of pigment:<br>Al—Li powder (350 C., 15 min) = 57.5<br>MICA = 14<br>Lithsil-6 = 100<br>Li2MoO4 = 0.5<br>Na2B4O710H2O = 0<br>Drying condition: 70 C., 5 hrs. | 10 | None | None | Top paint supplied the extra protection. |
| | | 19<br>20 | Al—Li powder (350 C., 15 min) — 57.5<br>MICA = 7.5 | 10<br>9 | None<br>None | None<br>None | Zinc powder addition. Increased the corrosion. Lithium |

TABLE I-continued

Summary of Al—Li Pigment Variation of Treatment

| GROUP | SET | PANEL ID | VARIATION OF TREATMENT | FACE RUST ASTM D-610 | BLISTERS ASTM D-714 | SCRIBE UNDER- CUTTING ASTM D-1654 | DISCUSSION & CONCLUSION |
|---|---|---|---|---|---|---|---|
| | | | Lithsil-6 = 100<br>Li2MoO4 = 0.5<br>Na2B4O710H2O = 0<br>Drying condition: room 70 C., 5 hrs. | | | | alone is better. |
| | | 21 | Formula of pigment:<br>Al—Li powder (350 C., 15 min) — 57.5<br>MICA = 19.3<br>Lithsil-6 = 100<br>Li2MoO4 = 0.5<br>Na2B4O710H2O = 0<br>Drying condition: room 70 C., 5 hrs.<br>Top paint: Carboline | 10 | None | None | The finer the powder is, the better the results are. Filtering to eliminate "chunks" of pigment eliminates all corrosion. |
| | | 22 | Formula of pigment:<br>Al—Li powder (200 mesh, not heated) = 49.06<br>MICA = 19.3<br>Lithsil-6 = 100<br>Li2MoO4 = 0.5<br>Na2B4O710H2O = 0<br>Drying condition: room 70 C., 5 hrs. | 10 | None | None | High percentage of MICA may help to get the better protection Once again, filtration eliminated pits. |
| | | 25 | Formula of pigment:<br>Al—Li powder (200 mesh, 350 C., 60 min) = 47<br>MICA = 8.5<br>Lithsil-6 = 100<br>Zn powder = 174<br>Li2MoO4 = 0.5<br>Na2B4O710H2O = 0<br>Drying condition: 70 C., 5 hrs. | 10 | None | None | There is no difference between the heated powder and without heated powder here. Once again, filtration eliminated pits. |

Discussion of the Results

Figure 1:
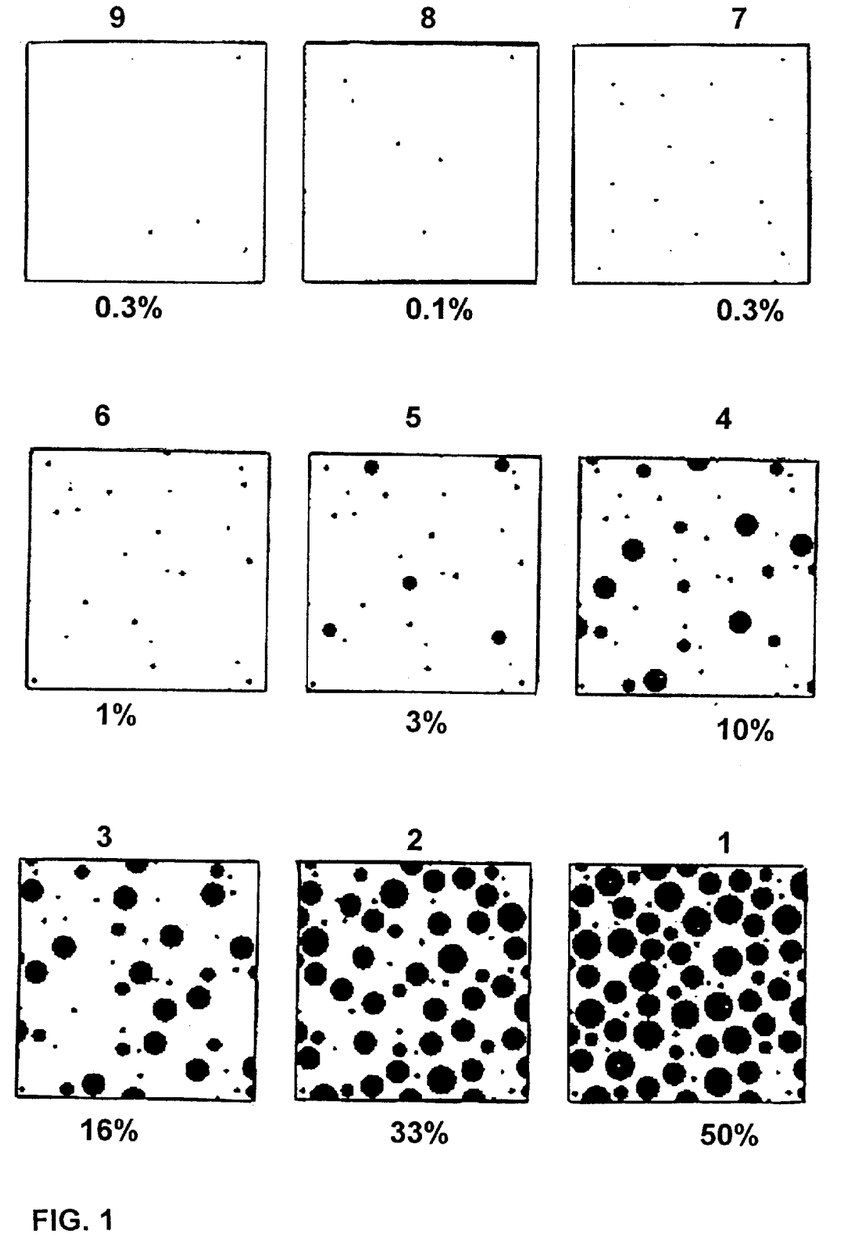
FIG. 1 illustrates exemplary area percentages observed for face rust in accordance with ASTM D-610. The percentages shown range from 0.03% to 50% face rust.
Figure 2:
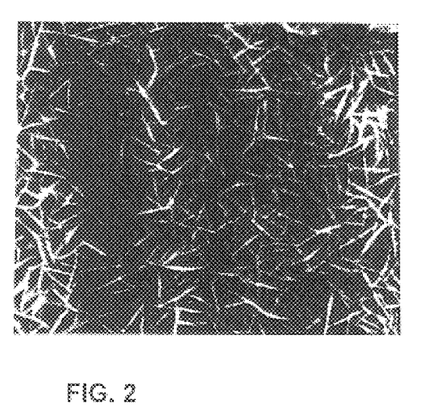
FIG. 2 illustrates the formation of crystals on a panel surface following treatment with sodium-aluminate and lithium-carbonate.

FIG. 2 shows the formation of crystals on the panel surface. Similar crystals, also shown in FIG. 3, were not as dense as in FIG. 2. The treatments used in producing the crystals were in accordance with the modified process recommended by Buckheit (Journal of Materials Research, Vol. 11, No. 1, January 1996), the disclosure of which is hereby incorporated by reference. The crystals formed contained talc, a carbonate containing aluminum lithium compound.

Figure 3:
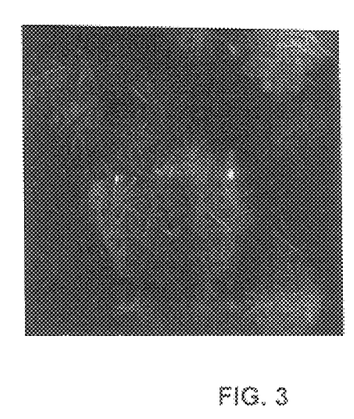
FIG. 3 illustrates crystal formation on a panel surface following treatment with a modified prior art process according to Buckheit, as discussed in "Non-Chromate Talc Conversion Coatings for Aluminum," supra.
Figure 4:
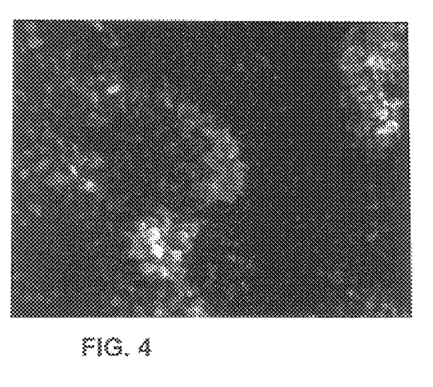
FIG. 4 illustrates a dense film as formed on a zincate treated panel.
Figure 5:
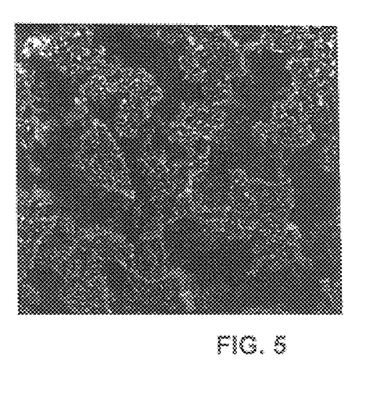
FIG. 5 illustrates a porous coating as formed on an aluminum panel treated with sodium-aluminate.

A dense film of black coating was observed in the zincate-treated aluminum panel (FIG. 4). The coating was firmly attached to the substrate, but was thicker compared to the film formed on the panels in FIGS. 2 and 3. Sodium aluminate treatment led to the formation of a porous, but adherent black coating on the aluminum substrate (FIG. 5). The talc formed from the carbonate was not tightly adherent to the substrate.

Figure 6:
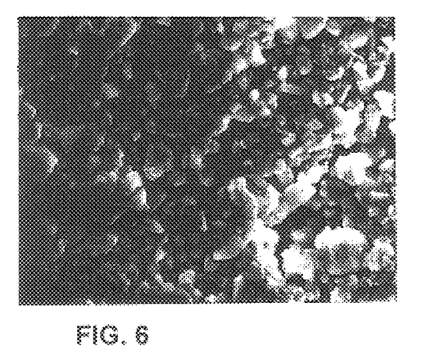
FIG. 6 illustrates a panel coating formed by lithium polysilicate.
Figure 7:
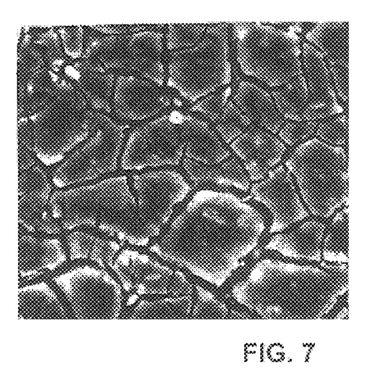
FIG. 7 illustrates a panel (Al 3003) film as cracked upon drying following a treatment with sodium-aluminate, and following a treatment with lithium polysilicate.

The coating formed by lithium polysilicate on aluminum, shown in FIG. 6, was loosely attached to the substrate and was highly non-adherent. Treatment with lithium polysilicate following sodium aluminate treatment led to the formation of a relatively adherent film (FIG. 7). The coating, however, cracked on drying.

Figure 8:
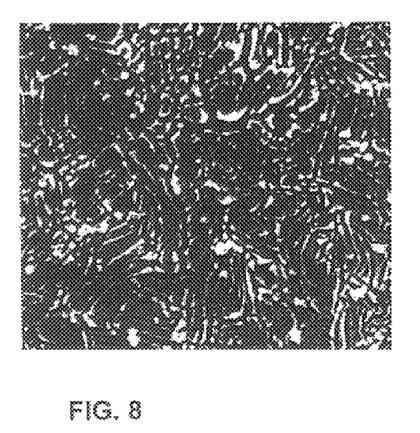
FIG. 8 illustrates a coating formed on alloy panel (Al 2024-T3), using a known prior art treatment.
Figure 9:
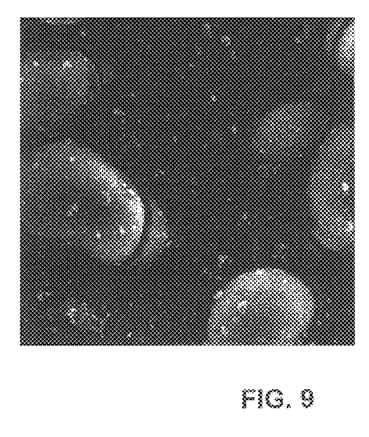
FIG. 9 illustrates a coating formed on an alloy panel (Al 2024-T3), treated with lithium-molybdate and potassium permanganate.
Figure 10:
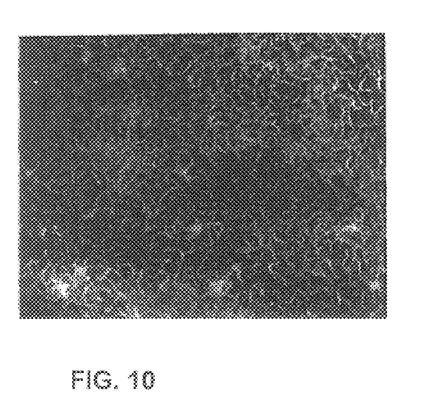
FIG. 10 illustrates how lithium-aluminate crystals form a porous network on the surface of a panel (Al 3003) after treatment with lithium-nitrate.

The coating formed on alloy panel (2024-T3), following a treatment in accordance with the treatment discussed in R.G. Buckheit et al., NACE Corrosion, 50, page 205, 1994, the disclosure of which is incorporated herein by reference, is shown in FIG. 8. The surface morphology shown in FIG. 8 was similar to that shown in FIG. 7, but was distinctly different from that obtained by Buckheit's modified treatment (FIGS. 2 and 3). It is known that long-term exposure is necessary to produce the talc crystals shown in FIGS. 2 and 3.

The alloy producing the coating in FIG. 8 was exposed to the lithium salt solution for 2.5 hours.

The coating formed on alloy panel (2024-T3), treated with lithium molybdate and potassium permanganate (FIG. 9), was characterized by a duplex structure and was highly nonadherent.

Lithium aluminate crystals formed a porous network (FIG. 10) and were somewhat soluble in aqueous environments.

Example 3

Evaluation of Modifying the Lithium Aluminate Crystal Morphology

Figure 11:
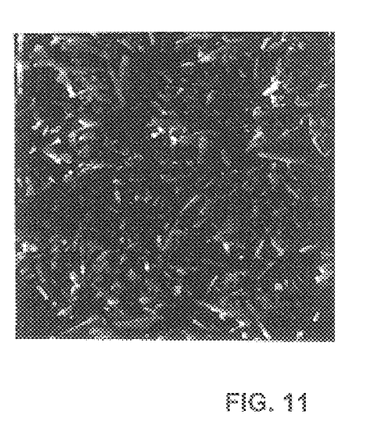
FIG. 11 illustrates $Ba^{++}$ (barium) modified lithium-aluminate crystals on the surface of an alloy panel (Al 3003), treated with lithium-hydroxide, then treated with Barium-Acetate.
Figure 12:
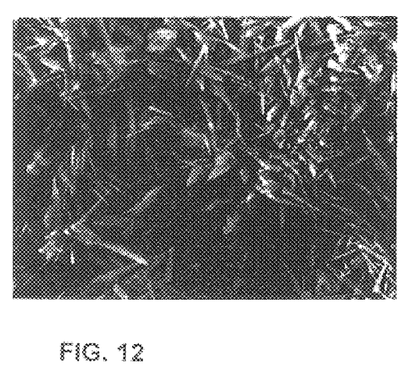
FIG. 12 illustrates $Ba^{++}$ modified lithium-aluminate crystals on the surface of an alloy panel (Al 3003) treated with lithium-carbonate and then with Ba-Silicate.

In this example, additional metallic ions were incorporated into the lithium aluminate film structure. Several metallic ions, i.e., $Ba^{++}$, $Zn^{++}$, and $Mn^+$, were evaluated to determine the resulting impact on film integrity, on the bond to the substrate and on the corrosion resistance. The SEM micrographs illustrating $Ba^{++}$ modified lithium aluminate crystals on the surface of alloy panels of Al 3003 are shown in FIGS. 11 and 12. FIGS. 11 and 12 show panels that were treated using salts of $Zn^{++}$ and $Mn^+$. When compared to unmodified lithium aluminate (FIG. 10), the $Ba^{++}$ modified crystals were more thick and dense.

Example 4

Evaluation of use of a Multi-Functional Polymer

Figure 13:
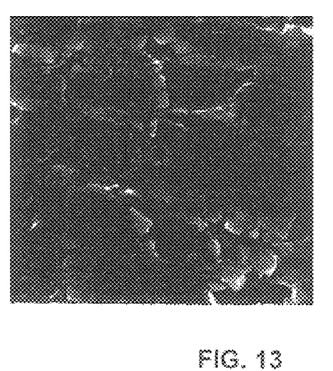
FIG. 13 illustrates a slightly corroded surface of a panel (Al 3003) after treatment with phosphono polycarboxylic acid (POCA) (pH=1.96) at room temperature.
Figure 14:
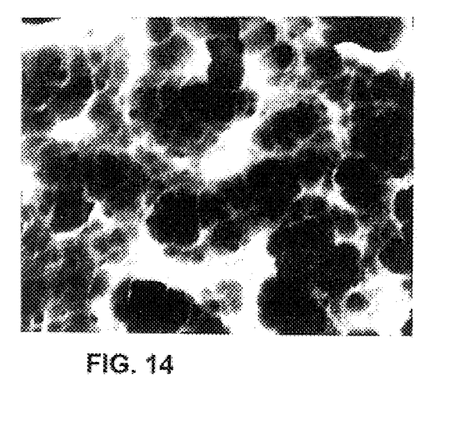
FIG. 14 illustrates the corroded surface of a panel (Al 3003), treated with POCA, following the raising of the temperature.

The polymer used for this example was a phosphonopolycarboxylic acid (POCA) Belcor 575, available from FMC Corporation. Both phosphonate and polycarboxylic groups have the ability to form insoluble complexes with aluminum. Details of different treatments using POCA (Belcor 575, pH 1.96) modified with LiQH (pH 11.8) are shown in Table 2. The treatment of alloy Al 3003 with POCA (pH 1.96) led to a slight corrosion of the alloy, as shown in FIG. 13. The corrosion was enhanced when the temperature of the electrolyte, Belcor 575, was raised, as shown in FIG. 14.

Figure 15:
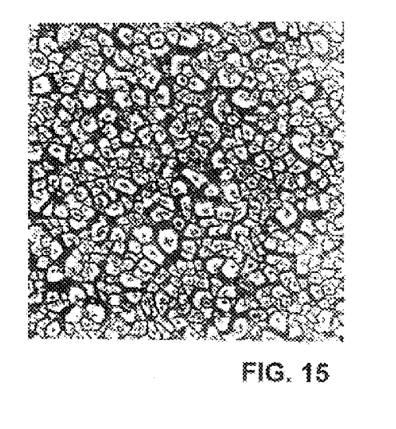
FIG. 15 illustrates the formation of an adherent deposit on an alloy panel (Al 3003), whose surface was treated with lithium containing POCA at a high pH (pH 11.6).
Figure 16:
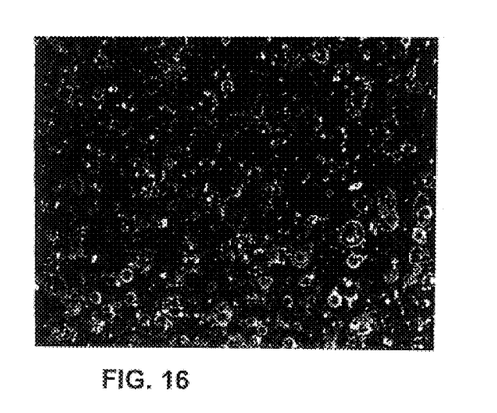
FIG. 16 illustrates the same panel as shown in FIG. 15, that has been cleaned ultrasonically. It can be seen that the deposits broke off at the interface, where the panel surface was not clean.
Figure 17:
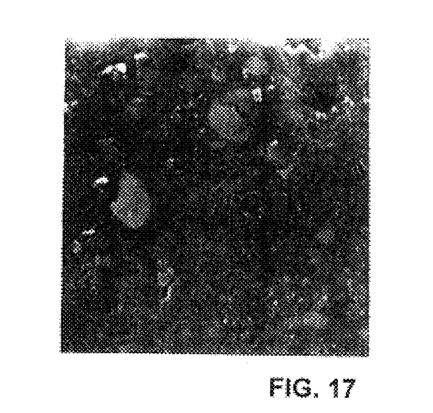
FIG. 17 illustrates a cross-section of a deposit layer, illustrating intimate contact at the interface.
Figure 18:
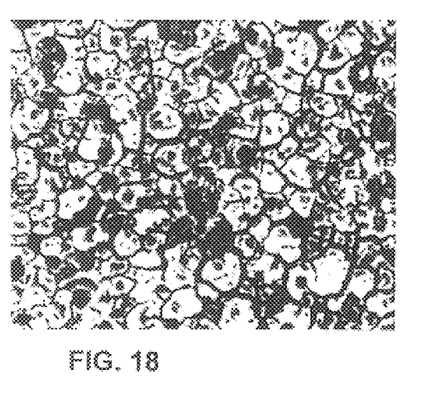
FIG. 18 illustrates an adherent deposit on an alloy panel (Al 3003), that had been surface treated with POCA+Li-Hydroxide, after exposure to a NaCl solution.
Figure 19:
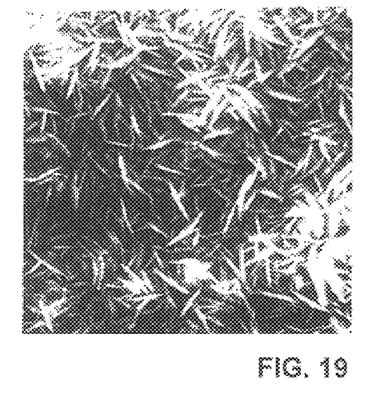
FIG. 19 illustrates lithium-aluminate crystals on the surface of a solid flat Aluminum-Lithium alloy that had been exposed to water.

Treatment of the same alloy panel with the lithium containing POCA at a higher pH (11.6) led to the formation of an adherent deposit on the alloy surface, as shown in FIG. 15. The space between the islands of deposit resulted when the deposit cracked due to drying. Vigorous ultrasonic cleaning was found to break off the deposits at their points of attachment on the alloy substrate, as shown in FIG. 16. A cross-section of the deposit layer is shown in FIG. 17. The deposits thus formed were subject to long-term corrosion in sodium chloride solution. SEM examination of the surface following this treatment indicated that the coating formed with phosphono polycarboxylic acid remained unattacked, as shown in FIG. 18, and was thus resistant to corrosion.

TABLE 2

Coating Processing Variables

| Aluminum Alloys | Solution | pH | Temp (° C.) | Time |
|---|---|---|---|---|
| Al 3003 | Lithium Carbonate + Sodium Aluminate | 11.7 | 60 | 15 hrs. |
| Al 3003 | (1) Basic lithium solution | 11.7 | 60 | 2.5 hrs. |
|  | (2) Modified lithium solution after Bucket | 12.8 | 60 | 15 hrs. |
| Al 3003 | Zincate solution (NaOH + ZnO) | N.D.* | 37 | 15 hrs. |
| Al 3003 | Sodium Aluminate (NaOH + Al(OH)3) | N.D.* | 37 | 15 hrs. |
| Al 3003 | Lithium Polysilicate | N.D.* | 60 | 15 hrs. |
| Al 3003 | (1) Sodium Aluminate | N.D.* | 60 | 15 min. |
|  | (2) Lithium Polysilicate | N.D.* | 60 | 15 min. |
| Al 2024-T3 | Lithium Carbonate + Lithium Hydroxide | 11.6 | 60 | 1.5 hrs. |
| Al 2024-T3 | Lithium Molybdate + Potassium Permanganate | 8.3 | 60 | 17 hrs. |
| Al 3003 | Lithium Nitrate | 6.47 | 20 | 18 hrs. |
| Al 3003 | (1) Lithium Hydroxide | 12.33 | 20 | 23 hrs. |
|  | (2) Ba-Acetate | N.D.* | 20 | 44 hrs. |
| Al 3003 | (1) Lithium Carbonate | 11.74 | 20 | 23 hrs. |
|  | (2) Ba-Silicate | N.D.* | 20 | 44 hrs. |
| Al 3003 | Belcor 575 | 1.96 | 40 | 5 min. |
| Al 3003 | Belcor 575 | 1.97 | 100 | 1 hr. |
| Al 3003 | Belcor 575 + Lithium Hydroxide | 11.6 | 20 | 10 min. |
| Al 3003 | (1) Belcor 575 + Lithium Hydroxide | 11.6 | 20 | 10 min. |
|  | (2) Exposed to 5% sodium chloride solution |  | 20 | 40 hrs. |

*N.D. — Not Determined

Example 5

Further reinforcement of the coating applied in Example 4 with an organic binder was achieved by coating the surface of the panel samples with a one or two milliliter film of the pure liquid polycarboxylic acid to produce a surface receptive to organic paints. The details of the procedure used in treating two aluminum alloys, Al 3003 and Al 6061, are shown below in Table 3. These results demonstrate that polycarboxylic acids have the ability to form stable complexes with aluminum. Based on these observations, a simplified procedure was devised to form a lithium aluminate coating and to anchor this coating in a polycarboxylate base.

Example 6

Formula for a primer or adhesive containing lithium silicate

The basic formula used for preparing the primer or adhesives containing lithium silicate in accordance with the compositions shown in Table 1 included:

| | |
|---|---|
| Lithium silicate | 100 parts by weight |
| Aluminum-Lithium powder 400 mesh heated to 350° C. under argon gas for 15 mins | 52.5 parts by weight |
| Water ground mica 420 mesh | 7.5 parts by weight |
| Lithium Molybdate | 0.5 parts by weight |
| $Na_2B_4O_7 \cdot 10H_2O$ | 0.4 parts by weight |

Example 7

Preparation of a primer or adhesive containing aluminum lithium

Alcoa 2090 Al—Li powder (1.7% Li) was heated in an oven at a temperature of 350° C. for a period of about 15 minutes. The Al—Li powder was filtered through a 400-mesh sieve. 57.5 parts of Al—Li powder was then mixed with 7.5 parts mica, 100 parts Lithsil-6, 0.5 part $Li_2M_0O_4$ and 0.4 part of $Na_2B_4O_7 \cdot 10H_2O$. The resultant pigment mixture was brushed on the surface of the panel. The panel was allowed to air dry for 30 minutes, and was then put in the oven at a temperature 70° C. for 5 hours to complete the drying. Variations were made as indicated in Table 1, as are the results of the variations.

TABLE 3

Summary of Surface Treatment

| Material | Treatment | pH | Temp. (° C.) | Time |
|---|---|---|---|---|
| Al 3003 | (1) Dipped in 0.1M NaOH | N.D.* | 20 | 4 min. |
|  | (2) Cleaned ultrasonically with distilled water | 11.1 | 20 | 2 min. |
|  |  |  | 20 | 2 min. |
|  | (3) Cleaned ultrasonically with acetone |  | 20 | 6 hrs. |
|  |  |  | 20 | 2 hrs. |
|  | (4) Dipped in water + Al—Li powder (3.3 wt. %) |  | 20 | 5 min. |
|  | (5) Dried |  |  |  |
|  | (6) Cleaned ultrasonically with water |  |  |  |
| Al 3003 | (1) Dipped in water + Al—Li powder | 10.8 | 20 | 0.5 hr |
|  | (2) Blew with air |  | 20 | 7 days |
|  | (3) Coated with slurry E7 + Al—Li powder + CaAl-Salicate |  | 20 | 20 min. |
|  | (4) Dried |  |  |  |
|  | (5) Cleaned ultrasonically with water |  |  |  |
| Al 6061 | (1) Dipped in 0.1M NaOH | N.D.* | 20 | 4 min. |
|  | (2) Cleaned ultrasonically with distilled water | 11.1 | 20 | 2 min. |
|  |  |  | 20 | 2 min. |
|  | (3) Cleaned ultrasonically with acetone |  | 20 | 18 hrs. |
|  |  |  | 20 | 20 min. |
|  | (4) Dipped in water + Al—Li powder |  | 20 | 15 min. |
|  |  |  | 20 | 3.5 hrs. |
|  | (5) Coupon was withdrawn from solution and ZN powder was sprinkled on the treated surface |  | 37 | 16 days |
|  |  |  | 20 | 20 min. |
|  | (6) Dried |  |  |  |
|  | (7) Painted with E7 and calcium aluminum silicate |  |  |  |
|  | (8) Dried |  |  |  |
|  | (9) Put in moisture chamber |  |  |  |
|  | (10) Cleaned ultrasonically with water |  |  |  |

*N.D. — Not Determined

Figure 20:
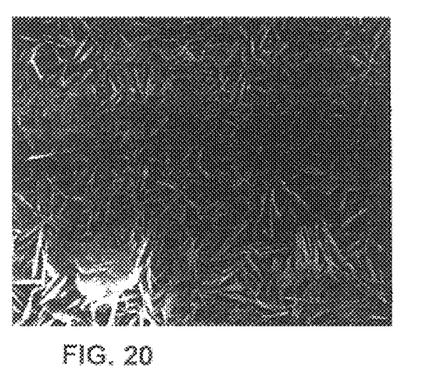
FIG. 20 illustrates crystals of lithium-aluminate on the surface of an alloy panel (Al 3003), that had been treated with an Al—Li Slurry.

For the panel (Al 6061) shown in Table 3, in addition to Al—Li powder, particulate Zn was included in the coating composition to evaluate additional corrosion protection possibly contributed by the sacrificial anode effect of Zinc. The sacrificial zinc, like the sacrificial lithium and the aluminum in combination, also worked well. Zinc, like aluminum, has the ability to complex with polycarboxylic groups and to form insoluble chelates. A SEM micrograph illustrating the surface of Al 3003 following treatment with an Al—Li slurry is shown in FIG. 20. The surface was covered with dense crystals of lithium aluminate. Lithium aluminate is unlike talc in a hard inert ceramic; talc is the flaky or fibrous powder, rather than crystals.

Figure 21:
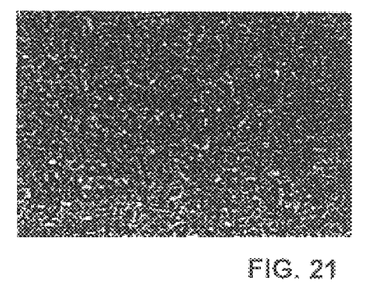
FIG. 21 illustrates a lithium-aluminate layer and dispersion of the Al—Li powder with Ca Al silicate particles in a polycarboxylate matrix.
Figure 22:
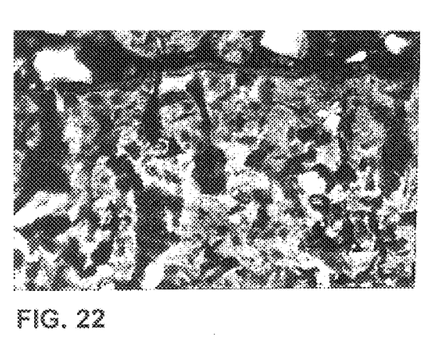
FIG. 22 illustrates a lithium-aluminate layer and dispersion of the Al—Li powder with Ca Al-silicate particles in a polycarboxylate matrix.
Figure 23:
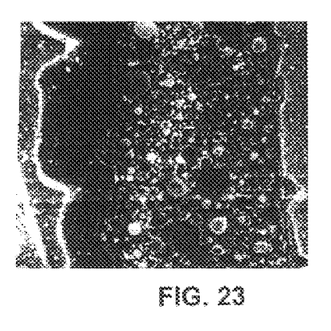
FIG. 23 illustrates an adhesive coating formed using an Al—Li and Zinc (Zn) powder.
Figure 24:
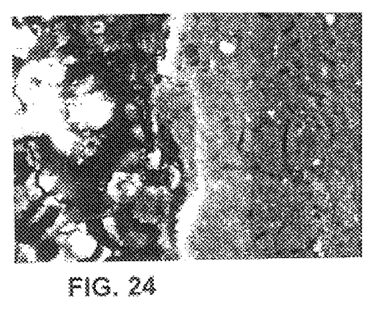
FIG. 24 illustrates another coating formed with an Al—Li and Zn powder.
Figure 25:
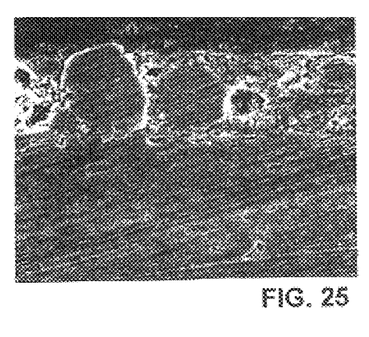
FIG. 25 illustrates a SEM photograph showing the essentially non-existent bond line created by an Al—Li adhesive composition on an alloy panel.

Cross-sections of the same alloy following polycarboxylic acid and calcium aluminum silicate treatment, presented in FIGS. 21, 22, and 25, show the outline of the lithium aluminate layer and the dispersion of Al—Li powder (spherical) and Ca—Al-silicate particles (irregular) in the polycarboxylate matrix. The coated layer shown at the top of FIG. 21 was bonded firmly to the alloy substrate. It was noted that the coating did not come loose during vigorous ultrasonic cleaning, nor was it affected by long-term corrosion in 5% NaCl solution. The coating formed with Al—Li and Zn powder (FIGS. 23 and 24) was found to be as adhesive and corrosion resistant as the coating without Zn.

A fundamental objective of the present invention was to identify the pigments that could satisfactorily be substituted for environmentally hazardous chromium coatings in the uses contemplated above. Since lithium salts have been shown to passivate aluminum, they can serve as viable substitutes for chromium in corrosion preventive systems. Also, they can be used in small quantities as a pigment substitute.

The foregoing embodiments are presented by way of example only; the scope of the present invention is to be limited only by the following claims.

What is claimed is:

1. An adhesive composition, said composition comprising aluminum lithium alloy particles and a multi functional polymer resin carrier.

2. A method for preventing corrosion, said method comprising applying to a substrate an effective amount of an adhesive composition comprising aluminum lithium alloy particles and a multi functional polymer resin carrier.

3. A method for bonding two substrates comprising aluminum or aluminum alloy, said method comprising applying to each of said substrates an effective amount of an adhesive composition comprising aluminum lithium alloy particles and a multi functional polymer resin carrier and placing said substrates in contact with each other.

4. A method for heat-free welding two substrates comprising aluminum or aluminum alloy, said method comprising applying to each of said substrates an effective amount of an adhesive composition comprising aluminum lithium alloy particles and a multi functional polymer resin carrier and placing said substrates in contact with each other.

5. A method for enriching the surface of an aluminum lithium pigment with lithium, said method comprising heating said pigment under an atmosphere of nonoxidizing inert gas to facilitate the migration of lithium to the surface of said pigment.

6. A method for combining at least one inhibitor and at least one chelater to form an insoluble surface which prevents corrosion and promotes adhesion.

7. A coating composition for application to a substrate, said composition comprising aluminum lithium alloy particles as a corrosion inhibitor and an acceptable coating vehicle.

8. A coating composition according to claim 7, wherein said substrate is comprised of aluminum, aluminum alloy or steel.

9. A coating composition for application to a substrate, said composition comprising aluminum lithium alloy particles that have been surface enriched with lithium by heating under an atmosphere of non-oxidizing inert gas.

10. A coating composition according to claim 7, wherein the coating vehicle is a lithium silicate.

11. A coating composition according to claim 7, wherein the coating vehicle is a latex.

12. A coating composition according to claim 7, wherein the coating vehicle is an epoxy.

13. A coating composition according to claim 7, wherein the coating vehicle is a vinyl.

14. A coating composition according to claim 7, wherein the coating vehicle is a urethane.

15. A coating composition according to claim 7, wherein the coating vehicle is an acrylic.

16. A coating composition according to claim 9, wherein the coating vehicle is a lithium silicate.

17. A coating composition according to claim 9, wherein the coating vehicle is a latex.

18. A coating composition according to claim 9, wherein the coating vehicle is an epoxy.

19. A coating composition according to claim 9, wherein the coating vehicle is a vinyl.

20. A coating composition according to claim 9, wherein the coating vehicle is a urethane.

21. A coating composition according to claim 9, wherein the coating vehicle is an acrylic.

22. A method according to claim 3, wherein one of said aluminum containing substrates comprises a thermal insulator.

23. A method according to claim 3, wherein one of said aluminum containing substrates comprises a protective coating.

24. A method according to claim 4, wherein one of said aluminum containing substrates comprises a thermal insulator.

25. A method according to claim 4, wherein one of said aluminum containing substrates comprises a protective coating.

* * * * *